Figure 1:
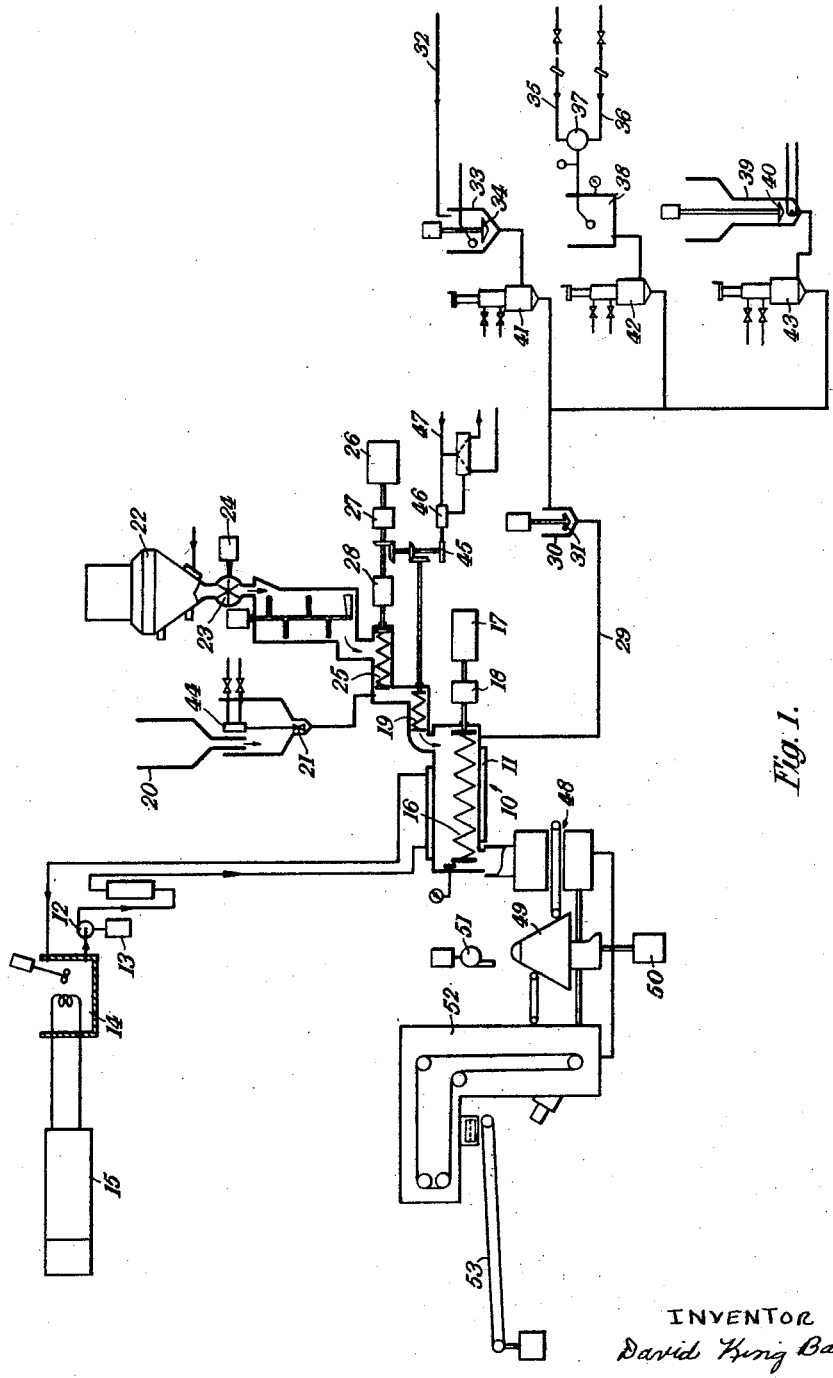

INVENTOR
David King Baker
By Watson, Cole, Grindle & Watson
ATTORNEYS

March 24, 1964      D. K. BAKER      3,125,968
MANUFACTURE OF BREAD DOUGH

Filed Oct. 24, 1960      3 Sheets-Sheet 3

INVENTOR
David King Baker
BY
Watson, Cole, Grindle & Watson
ATTORNEYS

United States Patent Office 3,125,968
Patented Mar. 24, 1964

3,125,968
MANUFACTURE OF BREAD DOUGH
David King Baker, Wansford, Peterborough, England, assignor to Baker Perkins Holdings Limited, Peterborough, England, a British company
Filed Oct. 24, 1960, Ser. No. 64,409
Claims priority, application Great Britain Oct. 27, 1959
5 Claims. (Cl. 107—30)

This invention has for its object to provide a process for the continuous production of bread dough which is suitable for immediate dividing and panning without any intermediate handing up, proofing or moulding.

The process according to the invention comprises supplying continuously to a mixing chamber metered quantities of a fermented dough component and of the remaining ingredients required in the dough, feeding the resultant mixture through the mixing chamber so that it at no point completely fills the chamber, working the material in the mixing chamber to develop the dough by exerting on it a stretching action with a minimum of shearing action and discharging from the mixing chamber continuously or as lumps in rapid sequence a developed dough suitable for immediate dividing and panning. Preferably, the fermented dough component is a fermented brew containing part (preferably 50%) of the flour, water, yeast and yeast food.

Certain previous proposals for the production of developed bread dough by a continuous mixing process involve forcing the dough under pressure through a mixing chamber which, for part of its length at least, is completely filled with the dough ingredients. The mixing members then plough their way through the compacted ingredients and develop the gluten primarily by subjecting the dough to a shearing action. The effect of the pressure on the dough is to reduce the size of the air cells in the emerging dough with the result that the final loaf has a very fine cellular structure resembling that of sponge rubber. Thus the loaf is unlike orthodox bread in cell structure, appearance and eating quality. By adopting the process according to the invention, however, it is possible to produce a dough having air cells which are fine by conventional standards but which, after dividing and panning will have the elongated structure characteristic of bread made by the normal batch methods in which the dough has been cross-panned. The dough produced by the process according to the invention has fine cell walls and the resulting loaves have the desirable characteristic of whiteness and sparkle.

The dough emerges from certain of the previously proposed continuous mixers at a temperature of the order of 100° F. and is of a semi-fluid nature. In order that it may tighten up on the pans it is necessary to incorporate in the mix an abnormally large amount of oxidants and this may give the bread an unpalatable taste. Dough can be made by the process according to the invention from a standard mix containing no abnormal amount of oxidant and the dough emerges from the mixer at a temperature of the order of 75°–85° F. To achieve this it is normally necessary to provide the mixer with a cooling jacket but as an alternative some of the ingredients may be pre-cooled before mixing. Thus the brew may be pre-cooled when a brew is used.

The invention includes apparatus for the continuous production of dough which includes an elongated stationary cylindrical mixing chamber having at one end an inlet or inlets for dough ingredients and at the other end an outlet for developed dough, a beater mounted eccentrically within the mixing chamber and including at least one longitudinally extending mixing bar, another longitudinally extending mixing bar in the mixing chamber, means for rotating the beater about the axis of the mixing chamber and for simultaneously rotating the beater in relation to the other mixing bar about an axis offset from the axis of the mixing chamber and at a speed nearly equal to its speed of rotation about the axis of the mixing chamber so that each of the mixing bars on the beater approaches closely to and thereafter recedes from both the other mixing bar and the wall of the chamber, the mixing bar or bars on the beater and the other mixing bar cooperating to exert a stretching action on the dough and thereby to effect development of the dough without the dough anywhere filling the mixing chamber.

Preferably the beater is constituted by a plurality of longitudinal mixing bars disposed at the same distance from a common axis of rotation and includes a helically extending worm for advancing the material through the mixing chamber.

If dough were to be mixed in a mixing chamber containing merely an eccentrically mounted feed worm which rotates about its own axis and also performs an orbital motion about the axis of the mixing chamber and carries no mixing bars for cooperation with a closely adjacent other mixing bar, the dough would accumulate at the exit end of the mixing chamber and the feed worm would churn through the compacted dough and merely shear it. When, however, mixing bars are fitted to the worm they reduce the propelling action of the worm. The dough is kept away from the centre of the worm by the bars, which tend to spread it along the mixing chamber, and accumulates in the space between the worm and the remote wall of the mixing chamber, with the result that the mixing chamber is not completely filled with dough at any transverse cross section. The dough is not mixed under pressure and the bars cooperate with the other mixing bar, as they rotate in relation to it, to exert a stretching action on the dough and so to develop the gluten network. The air is adequately dispersed throughout the dough in cells which are not excessively small. The dough can be effectively developed in the mixing chamber in a period of 3 to 5 minutes.

I may supply to the mixer a fermented brew, consisting of part (e.g. 50%) of the flour, water, yeast and yeast food prepared as described in my copending application Serial No. 64,386, filed October 24, 1960, this brew and liquid fat being introduced continuously by a pipe into the entry end of the mixing chamber. The solid ingredients, i.e. the rest of the flour and salt, are fed continuously into the entry end of the mixing chamber by a feed screw. The emerging dough may be divided and immediately panned by the apparatus described in my copending application Serial No. 64,385, filed October 24, 1960.

Alternatively the dough may be delivered from the mixer to a divider and thence to a hander, first prover and moulder before being placed in the baking pan, if it is not desired to place it in the pan immediately after dividing.

Again I may make the dough by a delayed salt process, the yeast, yeast food and all of the flour being mixed with water and then fermented, and the resulting fermented dough being delivered continuously or in small batches to the entry end of the mixing chamber. The salt may then be fed into the mixing chamber by the feed screw and the fat pumped directly into the mixing chamber.

Figure 2:
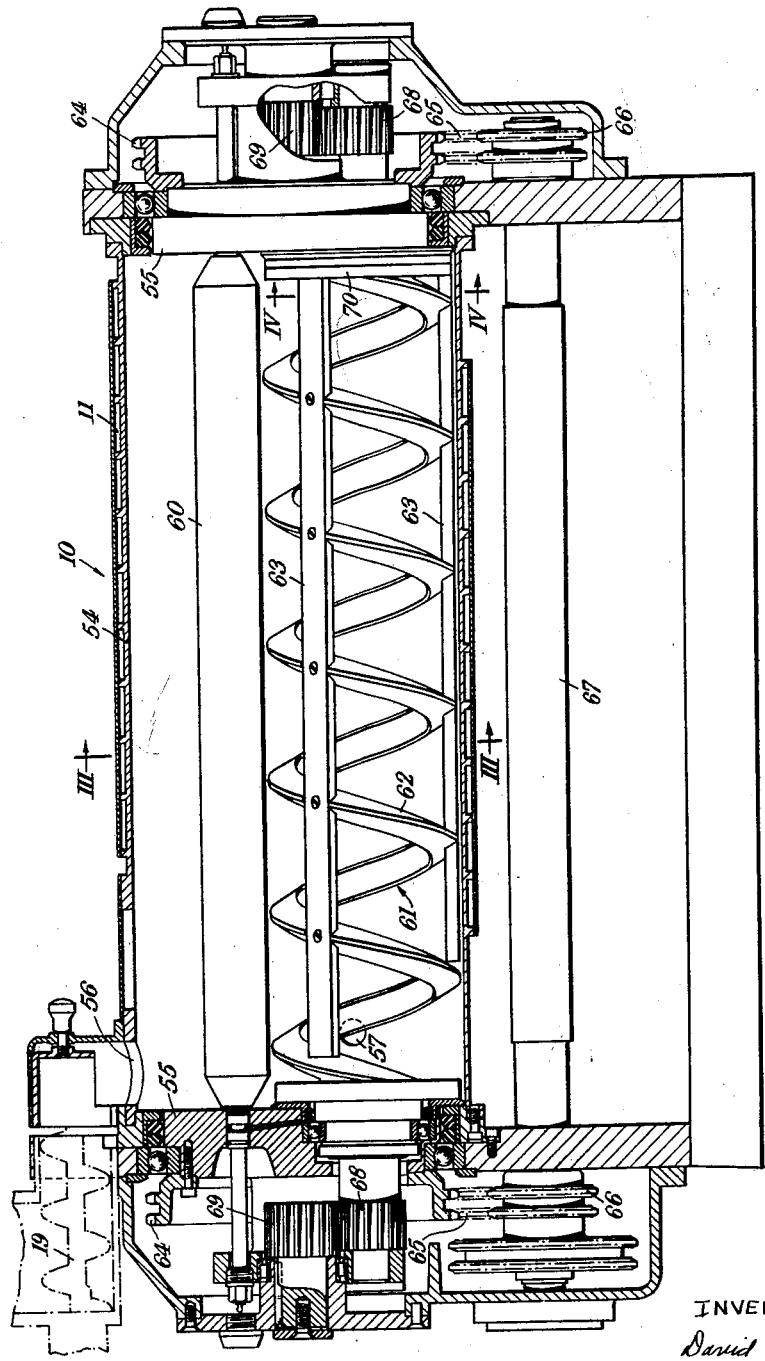
Figure 3:
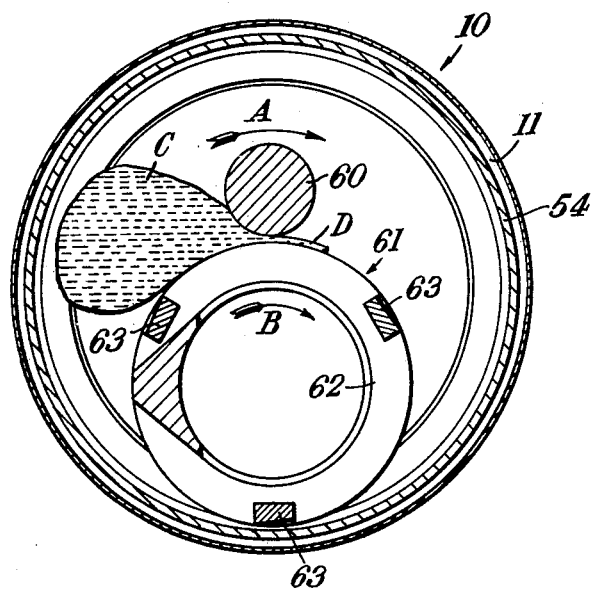
Figure 4:
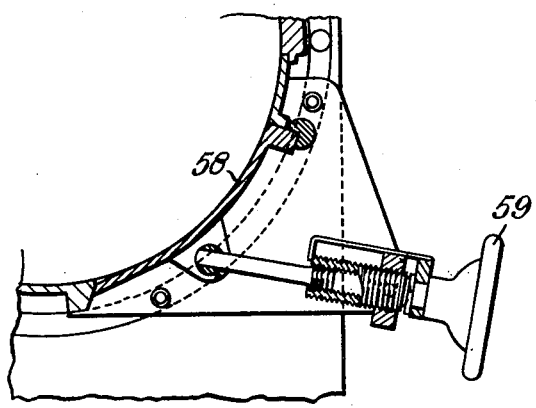

The invention will now be described in more detail, by way of example, with reference to the accompanying drawings, in which FIG. 1 is a schematic diagram of an apparatus for the continuous production of bread dough, FIG. 2 is a longitudinal section through the mixing chamber, FIG. 3 is a section on the line III—III in FIG. 2, and
FIG. 4 is a section on the line IV—IV in FIG. 2.

Referring first to FIG. 1, the mixing chamber 10 is there shown diagrammatically only, but its construction will later be described with reference to FIGS. 2–4. The mixing chamber 10 has a jacket 11 through which cold water is pumped by a pump 12 driven by a motor 13 from a tank 14 cooled by a refrigerator 15. A flowmeter 9 indicates the rate of supply of cold water to the jacket. The stirring mechanism in the mixer, indicated diagrammatically at 16, is driven by a motor 17 through variable speed gearing 18.

Flour and salt are supplied to the mixing chamber by a transfer worm 19. The salt is contained in a hopper 20 having a valve 21 which is periodically opened, as later described, to deliver a batch of salt to the worm 19. The flour is contained in a hopper 22 and is delivered by a rotary feeder 23, driven by a motor 24, to a metering worm 25 which feeds the flour to the transfer worm 19. The worms 25, 19 are driven by a motor 26 through the agency of variable speed gearing 27, 28. Liquid is fed to the mixing chamber 10 along a pipe 29 from a liquid blender 30 containing a stirrer 31. The liquid consists of (a) fermented brew, prepared as described in my aforesaid application No. 64,388 from flour, yeast, yeast food and water and supplied by a pump along a pipe 32 to a constant level tank 33 fitted with a float to control the pump, and with a stirrer 34, (b) water supplied from hot and cold water pipes 35, 36 and a blender 37 to a constant level tank 38, and (c) fat supplied from an electrically heated vessel 39 fitted with a stirrer 40.

The three component liquids are delivered to the blender 30 by metering pumps 41, 42, 43. These pumps and a motor 44 for operating the valve 21 controlling the supply of salt to the mixing chamber are operated by compressed air. A cam 45 driven by the motor 26 intermittently actuates a valve 46 to supply pulses of compressed air from an air supply line 47 to the pumps 41–43 and to the motor 44, so causing the three component liquids and the salt to be delivered to the mixing chamber 10 at rates properly related to the rate of supply of flour.

Developed dough is discharged from the mixing chamber continuously or semi-continuously to a divider 48, whence the divided pieces of dough are fed via a handing up device 49, provided with a fan 51, to a first prover 52, whence the dough is conveyed by a belt 53 to a moulder. The divider, hander and first prover are driven by a variable speed motor 50. As an alternative, however, a divider of the construction described in my aforesaid application No. 64,385 may be used, in which case the divider delivers the dough directly into pans.

Turning now to FIGS. 2–4 it will be seen that the mixing chamber consists of a stationary horizontal cylinder 54 having rotatable end walls 55. The cylinder has at one end an inlet 56, to which solid dough ingredients are supplied by the transfer worm 19 and an inlet 57 for liquid dough ingredients. At the other end of the cylinder is an outlet for developed dough which is provided with a pivoted door 58 (FIG. 4), the opening of which can be adjusted by a handwheel 59. The door 58 is closed during the initial stage of introduction of dough ingredients into the cylinder and is thereafter opened to the extent required for the particular mix undergoing treatment.

Attached to the end walls 55 and extending between them is a mixing bar 60, hereinafter termed a stirring rod. Mounted in the end walls 55 for rotation about an axis offset from that of the cylinder is a beater 61, constituted by a worm 62 to the exterior of which are attached three equally spaced longitudinal mixing bars 63. The end walls 55 carry sprockets 64 driven by chains 65 from sprockets 66 on a driving shaft 67. The stirring rod 60 and the beater 61 are thus given an orbital motion about the axis of the cylinder 54 in the same direction indicated by the arrow A in FIG. 3. The beater 61 carries a gear wheel 68 meshing with a fixed gear wheel 69, so that the beater is also rotated about an axis offset from that of the cylinder 54 in the direction indicated by the arrow B in FIG. 3 and at a speed approximating to its speed of rotation about the axis of the cylinder. Each beater bar 63 accordingly moves close to the wall of the cylinder 54 and then away again and thereafter moves close to the stirring rod 60 and then away again. As the result the dough in the mixing chamber tends to gather as indicated at C in FIG. 3, leaving the major part of the cross section of the mixing chamber unfilled with dough, and to be drawn out by a stretching action between successive mixing bars 63 and the stirring rod 60 as indicated at D. Without the mixing bars 63 the dough would be pushed by the worm 62 towards the delivery end of the mixing chamber where it would completely fill the mixing chamber and be sheared by the beater. As already explained the cell structure of the dough would not then be such as to permit a cross-panned type of loaf to be obtained by immediate dividing and panning.

The dough is discharged from the outlet controlled by the door 58 by the end boss 70 on the beater which produces a discharge of dough from the mixing chamber at each revolution.

The degree of filling of the mixing chamber is determined by the amount of opening of the door 58, and the degree of mixing is determined by the setting of the door 58, the rate of input of the ingredients to the mixing chamber and the speed of rotation of the beater 61.

In one specific example, in which dough is produced using six sacks of flour (each of 280 lbs.) per hour, the apparatus operates as follows:

Fermented brew is metered into the developing chamber 10 at the rate of 30–35 lbs. per minute, together with 14 lbs. per minute of flour, 0.5 lb. per minute of salt and 0.25 lb. per minute of fat. The brew is produced continuously as described in my aforesaid application No. 64,388, utilizing 14 lbs. flour per minute and 16.35 lbs. liquid per minute. The liquid consists of a mixture made up in batches of 160 lbs. of water, 2 lbs. of yeast and 1.5 lbs. of yeast food. The production rate of dough is 45.1 lbs. per minute.

The speed of rotation of the beater 61 about the axis of the developing chamber is 90 r.p.m. and the speed of rotation of the beater about its own axis is also approximately 90 r.p.m.

The temperatures employed were brew 80° F., flour 70° F., salt 70° F., coolant water into the jacket 11 40° F., coolant water out of the jacket 44° F., final dough temperature 80° F. The coolant flow is approximately 4 gallons per minute.

While the above-described developing apparatus is primarily intended for the continuous production of bread dough, it can nevertheless also be used for the continuous production of biscuit dough, particularly dough for biscuits of the cream cracker type.

What I claim as my invention and desire to secure by Letters Patent is:

1. Apparatus for the continuous production of developed bread dough, which includes an elongated cylindrical mixing chamber having at one end an inlet for dough ingredients and at the other end an outlet for developed dough, means for supplying dough ingredients continuously to said inlets, a mixing worm within said chamber which extends longitudinally of the chamber with its axis offset from the axis of said chamber and has a helical blade positioned close to the inner wall of the chamber, at least one mixing bar extending longitudinally of the chamber and attached to the exterior of said mixing worm, means imparting rotation to said mixing worm about its own axis and also about the axis of said chamber, a rod extending longitudinally within said chamber and situated close to the periphery of said mixing worm and means for rotating said rod about the axis of said chamber, said rod and said mixing bar cooperating to exert a stretching action on the dough and thereby develop the dough without the dough anywhere filling the mixing chamber.

2. Apparatus according to claim 1, in which said supplying means includes a motor driven device for supplying flour at a pre-determined rate to the mixing chamber, pneumatically operated metering pumps for supplying liquid ingredients to the mixing chamber, a cam driven by the motor and a valve actuated by said cam for supplying intermittently pulses of compressed air to the metering pumps.

3. Apparatus according to claim 1, in which the worm carries a plurality of spaced longitudinally extending mixing bars.

4. Apparatus according to claim 2, which includes pneumatically operated means controlled by the valve for supplying salt to the mixing chamber.

5. Apparatus according to claim 2, in which the metering pumps respectively supply to the mixing chamber liquid, fat, water and a fermented brew of flour, water, yeast and yeast food.

References Cited in the file of this patent

UNITED STATES PATENTS

| | | |
|---|---|---|
| 1,910,967 | Ruckdeschel | May 23, 1933 |
| 2,610,042 | Dryon | Sept. 9, 1952 |
| 2,868,143 | Strahmann | Jan. 13, 1959 |
| 2,896,556 | Sippel et al. | July 28, 1959 |
| 2,920,964 | Oakes | Jan. 12, 1960 |
| 2,926,619 | Kruder | Mar. 1, 1960 |
| 3,001,486 | Duncan et al. | Sept. 26, 1961 |
| 3,033,132 | Duncan et al. | May 8, 1962 |

FOREIGN PATENTS

| | | |
|---|---|---|
| 353,240 | Great Britain | July 23, 1931 |